United States Patent
Okita et al.

[11] Patent Number: 6,051,082
[45] Date of Patent: Apr. 18, 2000

[54] ROLLING BEARING

[75] Inventors: Shigeru Okita; Manabu Ohori; Satoshi Kadokawa; Akihiro Kiuchi; Akira Iida, all of Kanagawa, Japan

[73] Assignee: NSK Ltd., Tokyo, Japan

[21] Appl. No.: 09/009,688

[22] Filed: Jan. 20, 1998

[30] Foreign Application Priority Data

Jan. 20, 1997 [JP] Japan .................................. 9-019629
Dec. 17, 1997 [JP] Japan .................................. 9-363739

[51] Int. Cl.[7] ............................ C22C 38/18; C22C 38/02
[52] U.S. Cl. ......................... 148/333; 148/906; 384/492
[58] Field of Search .................................. 148/906, 319, 148/320, 333; 384/492

[56] References Cited

FOREIGN PATENT DOCUMENTS

| | | | |
|---|---|---|---|
| 74-026167 | of 0000 | Japan . | |
| 2-168021 | 6/1990 | Japan | F16C 33/34 |
| 3-117724 | 5/1991 | Japan | F16C 33/66 |
| 7-103241 | 4/1995 | Japan | F16C 33/64 |
| 8-312651 | 11/1996 | Japan | F16C 33/62 |
| 2 244 103 | 11/1991 | United Kingdom | F16C 33/30 |
| 2 268 753 | 1/1994 | United Kingdom | C22C 38/18 |

*Primary Examiner*—Deborah Yee
*Attorney, Agent, or Firm*—Sughrue, Mion, Zinn, Macpeak & Seas, PLLC

[57] ABSTRACT

A rolling bearing includes a rolling element made of a steel containing 0.9 to 1.1 wt. % C, 0.1 to 0.5 wt. % Si, 0.2 to 0.8 wt. % Mn, 1.0 to 1.8 wt. % Cr, with the balance being Fe and inevitable impurities. In the rolling bearing at least the surface of the rolling element includes carbides having an area fraction of 5% to 15%; of these carbides, carbides having an averaged particle diameter of 0.5 μm or more share 50% or more of the area fraction of all the carbides; and of the carbides, carbides having an averaged particle diameter of 1 μm or more share 2% or less of the area fraction of all the carbides; and wherein the rolling element has at least a Vickers surface hardness HV of 750 to 900.

12 Claims, 7 Drawing Sheets

AREA FRACTION X' OF CARBIDES HAVING AN
AVERAGED PARTICLE DIAMETER OF 1μm OR MORE (%)

AREA FRACTION X" OF CARBIDES HAVING AN
AVERAGED PARTICLE DIAMETER OF 0.5μm OR LESS (%)

ROLLING BEARING

BACKGROUND OF THE INVENTION

The present invention relates to a rolling bearing, and more particularly, a needle bearing to aid in power transmission within a transmission, or the like, used for automobiles, agricultural machinery, construction equipment, etc. More particularly, the present invention relates to a rolling bearing such as a comparatively small sized precision ball bearing used for supporting a rotating spindle which is incorporated in a fan motor for air-conditioning purposes, a cooling fan motor used in equipment of various types, a hard disk drive (hereinafter abbreviated as HDD), or a video tape recorder (hereinafter abbreviated as VTR).

In an automobile, or the like, a rolling bearing is used for a rotational section of a transmission which transmits power. A needle bearing is used in many cases in terms of load capacity or space. Particularly, needle bearings including radial needle bearings and thrust needle bearings are heavily used for automatic transmission.

High carbon chrome bearing steel 2 (SUJ2) has been used as material for the rolling bearing of this type and is composed of 0.95 to 1.05 wt. % C, 0.15 to 0.35 wt. % Si, 0.5 wt. % or less Mn, 1.30 to 1.60 wt. % Cr, with the remainder being Fe and inevitable impurities.

The dimensional accuracy, such as roundness, of coiled material used for a rolling element of the rolling bearing must be strictly set. For this reason, as shown in FIG. 1, after having undergone a softening process 52, a hot-rolled coil 51 is usually subjected to a round of processes repeatedly: namely, a pickling process 53, a coating process 54, and a cold drawing process 55, to thereby manufacture high-precision coiled material 56.

In recent years, another technique has been developed by virtue of an improvement in rolling techniques. As shown in FIG. 2, coiled material having the degree of precision as that of solid-drawn material is manufactured by subjecting the hot-rolled coil 51 to a precision cold rolling process 57. Subsequently, as by the manufacturing method shown in FIG. 1, the coiled material is subjected to a round of processes: i.e., the softening process 52, the pickling process 53, the coating process 54, and the cold drawing process 55, to thereby manufacture the high-precision coiled material 56 (this conventional technique will be hereinafter referred to as the "first conventional technique").

There is a known technique intended to obtain a rolling bearing which has superior durability and is prevented from sustaining so-called peeling damage or sliding wearing. According to this technique, an element having superior wearing resistance, such as Cr, Mo, or V, is added to the material of a bearing ring or a rolling element. Alternatively, the material of a bearing ring or a rolling element is subjected to a carburizing or carbonitriding treatment to thereby increase the surface hardness or compression residual stress of the bearing. Still another technique is proposed, wherein a plurality of concave indentations are formed in the surface of a bearing ring or rolling element from analogous viewpoints to thereby control the ratio of axial surface hardness to circumferential surface hardness (as described in Japanese Patent Application Unexamined Publication Nos. Hei-2-168021 and Hei-3-117724) (these conventional techniques will be hereinafter referred to as the "second conventional techniques").

A comparatively small precision ball bearing (hereinafter simply referred to as a "ball bearing") used for a fan motor for air conditioning purposes or used for supporting a rotating spindle of a HDD is used under comparatively light load. However, there is a demand that vibrations or noise produced from the bearing be reduced. In some cases, the ball bearing reaches its limit of use by reason of acoustic deterioration. Because of this, the ball bearing is desired to have superior acoustic properties so that the ball bearing can be prevented from reaching its limit of use as a result of acoustic deterioration before reaching its fatigue strength.

From the foregoing viewpoints, several techniques are proposed: e.g., a technique of reducing the amount of residual austenite which is included in steel and is considered to deteriorate the acoustic characteristics of the ball bearing to a certain amount (as described in Japanese Patent Application Unexamined Publication No. Hei-7-103241), or a technique of increasing the surface hardness of a ball bearing so as to have superior resistance to acoustic deterioration by subjecting at least the material of a bearing ring to a carbonitriding treatment or increasing the percentage content of Si included in a bearing ring to thereby reduce the amount of residual austenite to zero (as described in Japanese Patent Application Unexamined Publication No. Hei-8-312651) (these conventional techniques will be hereinafter referred to as the "third conventional techniques).

The first conventional technique enables a high-precision coil material which can be used as material for a rolling element of a bearing to be obtained at a low cost through one cold drawing operation. However, if lubrication conditions are inappropriate or foreign articles are mixed into a bearing, an inner-outer race serving as a bearing ring comes into metal-to-metal contact with a rolling element because of an insufficient layer of oil while the bearing is in use. Consequently, the bearing is susceptible to surface damage such as peeling damage or sliding wearing. More specifically, in a transmission system of an automobile, the passage of lubrication of a bearing is complicated from structural viewpoints. Because of this, a lubricant is sometimes insufficiently fed to the inside of the bearing. Thus, there are many cases where the bearing is used under the harsh lubrication condition. If the bearing is used under such harsh lubrication condition, the layer of oil is insufficiently formed in the area where the rolling element comes into contact with the bearing ring, bringing them into direct metal-to-metal contact with each other. A so-called rolling surface sustains surface damage such as peeling damage or sliding wearing, resulting in the risk of early peeling or anomalous vibrations.

The second conventional techniques enable the bearing to be prevented from sustaining surface damage such as peeling damage or sliding wearing. However, these techniques require the control of surface roughness of a bearing by subjecting the bearing to special treatment after the bearing has undergone a grinding operation, inevitably adding to the cost.

There are considered various causes of vibrations or noise which develops in the ball bearing. In the foregoing comparatively small ball bearing, an increase in the vibrations or noise which develops in the raceway surface of the bearing ring is considered to be the principal cause of vibrations and noise. More specifically, the amount of residual austenite-which is permanently deformed under impact load, or the like, so that the raceway surface is susceptible to impressions-is considered to be the principal cause of acoustic deterioration. For this reason, a reduction in the amount of residual austenite or the removal of residual austenite is considered to be effective countermeasure against acoustic deterioration.

However, as in the foregoing third conventional techniques, the reduction in the amount of residual austenite or the removal of residual austenite involves a so-called subzero treatment or a high-temperature tempering treatment, thereby adding to the cost.

The conventional third techniques are intended to remove residual austenite, which is the cause of impression, to as small an amount as possible and are not intended to reduce the vibrations or noise originating from the raceway surface. Therefore, the acoustic characteristics of the ball bearing are not drastically improved by the third techniques.

SUMMARY OF THE INVENTION

The present invention has been contrived in view of the foregoing drawbacks in the conventional techniques, and the object of the present invention is to provide a rolling bearing which avoids surface damage as much as possible to thereby improve the durability of the rolling bearing.

A second object of the present invention is to provide an inexpensive rolling bearing which reduces the vibrations or noise produced by the raceway surface of the rolling bearing and has the superior acoustic characteristics.

Assuming that under inappropriate lubrication condition a foreign article is mixed into the inside of a radial or thrust needle bearing used in a transmission, the inventors of the present patent application have found the following results through the study of durability of the needle bearing.

(1) The damage received by the needle bearing is classified into surface damage such as peeling damage or sliding wearing. In many cases, the rolling element is severely damaged.

(2) There is a tendency for the needle bearing to have a longer life as the value of HV representing the Vickers surface hardness of the needle bearing (hereinafter simply referred to as the "surface hardness") becomes greater. In a case where an element which generates carbides, such as Cr, Mo, or V, is added in optimum amount to the material of the needle bearing in such a way that minute carbides are precipitated on the surface of the needle bearing, the needle bearing tends to have a much longer life. More specifically, it has become obvious that the durability of the needle bearing can be improved by precipitation of a large amount of minute carbides on the surface of the bearing, particularly on the surface of the rolling element.

(3) In a case where the material of the needle bearing is subjected to a carburizing or carbonitriding treatment, the surface of the material is hardened by dissolution of C, N or precipitation of carbides or carbonitrides, and the concentration gradient of C, N occurs. As a result, compression residual stress develops in the material. More specifically, in a case where the material of the needle bearing is subjected to a carburizing treatment, the durability of the needle bearing is improved compared with that of a conventional rolling bearing. It has also become evident that in a case where the material of the needle bearing is subjected to a carbonitriding treatment, minute carbonitrides are precipitated on the surface of the bearing, and the value of surface hardness HV becomes greater to thereby enable the durability of the bearing to be improved to a much greater extent.

From the foregoing results of such study, the inventors of the present invention have learned that in a case where foreign articles have been mixed into the inside of the needle bearing under the inappropriate lubrication condition, the value of surface hardness HV of the needle bearing becomes high, and that the durability of the bearing is improved by precipitation of minute carbides on the surface of the bearing.

In a ball bearing which has been finished by means of the current superior machining technique, vibrations or noise-which develops in the ball bearing in a case where an appropriate lubricant is used for the ball bearing, with the exception of a case where accessories such as cages or sealing members are defective-is considered to be so-called "race noise" which develops in the raceway surface of the ball bearing. It is reported that the "race noise" results from microscopic "waviness" occurred in the raceway surface and selectively oscillates an exciting force component in the vicinity of the characteristic frequency of the bearing ring to thereby cause noise ("Vibrations and Noise in a Rolling Bearing" Noda, NSK Technical Journal No. 661, 1996, which will be hereinafter referred to as "Reference 1"). A plurality of very-minute and irregularly-continual threads (or protuberances) are formed on the surface of the raceway surface of the bearing ring of the ball bearing and the surface of the rolling element. Accordingly, the ball bearing has waviness in the circumferential direction of the continual threads, the waviness corresponding to the number of continual threads. It is reported that, because of the waviness, when the ball bearing rotates, vibrations are generated, thereby accentuating the vibrations of the bearing ring in a normal mode ("Noise of a Ball Bearing" Igarashi, Japan Society of Mechanical Engineers Collection, Vol. 30, No. 220., 1964, which will be hereinafter referred to as "Reference 2"). In short, according to References 1 and 2, it is reported that vibrations and noise result from the "race noise," and the "race noise" results from "waviness." Consequently, it is conceivable that the acoustic characteristics of the ball bearing determined by the raceway surface can be improved by reduction of the "waviness" which will cause vibrations.

High carbon chrome bearing steel 2 (SUJ2) is usually used as material for a ball bearing. However, carbides measuring 1 $\mu$m or thereabouts are distributed over the surface of SUJ2. As a result of having conducted the study of the acoustic characteristics of SUJ2 while the distribution of carbides is changed in various ways, the inventors of the present invention have found the following results. Namely, (4) There is no substantial change in vibrations in the bearing after the carbides formed on the bearing ring having been refined.

(5) The vibrations in the bearing are reduced as a result of refining of the carbides formed on the rolling element.

(6) As a result of refining of both the carbides formed on the bearing ring and the carbides formed on the rolling element, vibrations are reduced to the same extent to which the vibrations are reduced in (5).

From the foregoing results of the study, the inventors of the present patent application have learned that a reduction in vibrations in the rolling element is effective in reducing the noise caused by the bearing to a still lower level, and that the noise caused by the bearing, whose "race noise" is reduced to its limitation by precision machining, can be reduced to a still lower level by refining of the carbides formed on the rolling element.

In short, it has become obvious that the refining of the carbides formed on the rolling element enables the durability of and the acoustic characteristics of the rolling bearing to be improved.

Next, in terms of the productivity of and the ease of mass production of a bearing, it is required that the means for refining carbides should refine carbides with the minimal cost.

As mentioned previously in (2) and (3), in a case where an element, such as Mo or V, which produces carbides is added in optimum amount to the material of a bearing or the material of a bearing is subjected to a carbonitriding treatment to thereby precipitate a large amount of minute carbides on the surface of the bearing, an expensive element such as Mo or V must be used or a heat processing step is additionally required, thereby resulting in an increase in the cost.

With regard to ball bearings, a rolling element is continually mass-produced from coiled material through a cold die molding operation in ordinary manufacturing processes. As matters now stand, the manufacturing cost of the rolling element is thought to have already been minimized. Further, the rolling element of the ball bearing has a spherical shape, which makes it impossible to inscribe a print or a mark on the surface of the rolling element. For this reason, the production of all rolling elements is controlled on a lot basis. Consequently, in the case of a ball bearing having a spherical rolling element, even if the use of inexpensive material and workability are taken into consideration, there will arise an increase in costs associated with the re-arrangement of a process flow or material control. Therefore, it is substantially impossible to reduce the manufacturing cost of the rolling element. For this reason, it is inadvisable to change the composition of an alloy by reducing the percentage content of C or Cr which contributes to the generation of carbides.

From the results of the study further conducted by the inventors, they have learned that if high carbon chrome bearing steel having the same composition as that of the conventional SUJ2 is subjected to a precision warm rolling process, it is possible to obtain at low cost a bearing which has a hard surface even if it is subjected to hardening and tempering treatments, as is the conventional SUJ2, and has minute carbides precipitated on the surface of the bearing.

The surface damage resulting from peeling damage or sliding wearing is considered to occur in the following steps. Namely, the surface of the bearing is minutely cracked as a result of sliding or contacting of a roller, so that the surface layer of the bearing is peeled to thereby form minute cracks. Further, acoustic deterioration is thought to be attributable to the "waviness" caused by carbides which are distributed over the surface of the rolling element and have an averaged particle diameter of 1 μm or more. If coiled material is subjected to a cold drawing treatment or a precision cold rolling treatment after having finished undergoing a hot rolling treatment, as in the case of the conventional technique (i.e., the first conventional technique), carbides cannot be refined during the machining processes. In other words, if high carbon steel containing 1.0% or thereabouts C is cooled after having undergone a hot rolling treatment, there are produced reticulate carbides (or a cementite) and a perlitic organization. In this state, the steel is too hard to machine. Therefore, in the conventional technique, the steel is subjected to the softening process 52 (see FIGS. 1 and 2) before being subjected to a cold drawing treatment. Such a softening process usually involves a spheroidizing treatment. In the spheroidizing treatment, when the steel is heated to a temperature in a vicinity of so-called transformation temperature $A_1$ (a temperature of 723° C.), a part of the reticulate carbides are fused to thereby break the reticulate organization of perlite, so that the carbides are spheroidized. As a result, after the steel has finished undergoing the spheroidizing treatment, a ferrite matrix includes spheroidized carbides. Carbides which share 50% or more of the area fraction of all the carbides have an averaged particle diameter of 0.5 μm or more. Further, carbides having an averaged particle diameter of 2 μm may be included in the ferrite matrix. Therefore, carbides cannot be refined.

In contrast, if coiled material is subjected to a precision warm rolling treatment, reticulate carbides and a perlitic organization are subjected to a hard working operation simultaneously with carbides being spheroidized through a warm heating process. As a result, the reticulate carbides and plate-like carbides included in the perlite are refined and spheroidized. After having finished undergoing a cooling process, the carbides form a minute spheroidized organization. In short, we have learned that even in a case where the perlitic organization is subjected to a cold rolling treatment, if the organization is subjected to a spheroidizing process for softening purpose after the cold rolling treatment, there is produced a substantially ordinary spheroidized organization. In contrast, the perlitic organization is subjected to a precision warm rolling treatment, carbides can be minutely spheroidized.

A rolling bearing according to the present invention is obtained by setting heating conditions used in the foregoing precision warm rolling process in consideration of the previous descriptions. The rolling bearing according to the present invention comprises rolling element formed of a steel containing 0.9 to 1.1 wt. % C, 0.1 to 0.5 wt. % Si, 0.2 to 0.8 wt. % Mn, 1.0 to 1.8 wt. % Cr, with the balance being Fe and inevitable impurities. At least the surface of the rolling element includes carbides having an area fraction of 5% to 15%. Of these carbides, carbides having an averaged particle diameter of 0.5 μm or more share 50% or more of the area fraction of all the carbides. Further, of the foregoing carbides, carbides having an averaged particle diameter of 1 μm or more share 2% or less of the area fraction of all the carbides. Still further, the rolling element has a surface hardness HV of 750 to 900.

The rolling bearing having the foregoing composition and component has longer life, as well as having a minute surface and surface hardness which contribute to an improvement on the acoustic characteristics of the rolling bearing. From the result of the study conducted by the inventors of the present invention, carbides have been found to be hardly refined even if the organization that has been spheroidized is subjected to a warm rolling process.

DETAILED DESCRIPTION OF THE PREFERRED EMBODIMENTS

Figure 1:
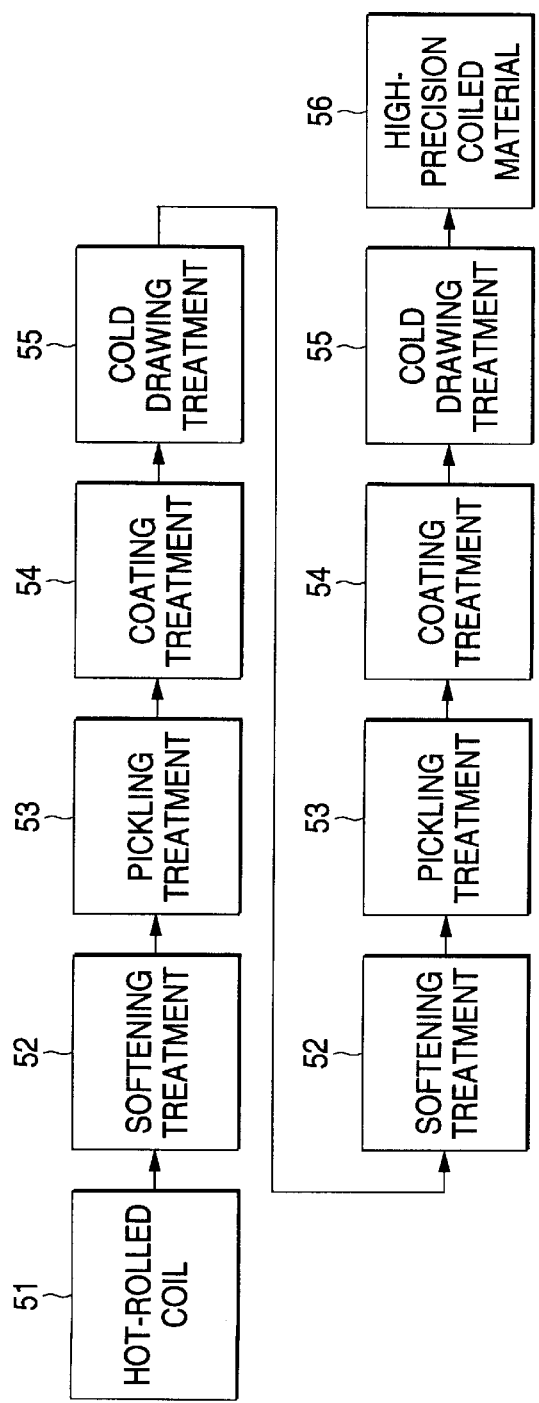
FIG. 1 is a flowchart showing the steps for manufacturing coiled material which is used in a conventional process of manufacturing a needle roller of a rolling bearing.
Figure 2:
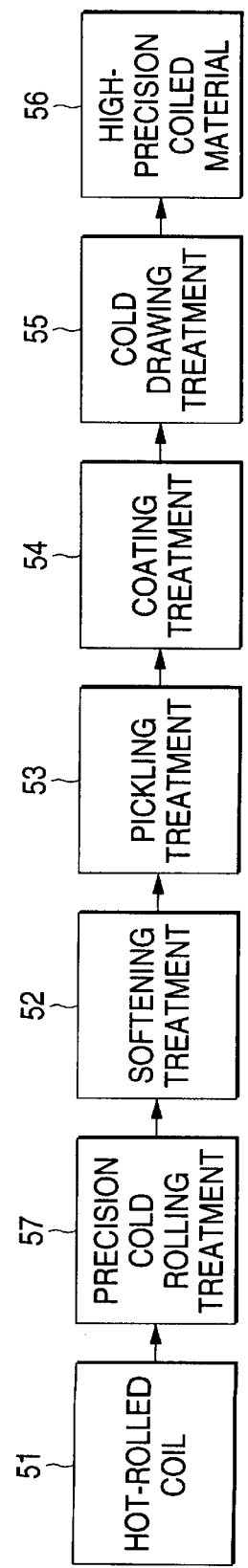
FIG. 2 is a flowchart showing the steps for manufacturing coiled material which is used in another conventional process of manufacturing a needle roller of a rolling bearing.

Next, the principle of embodiments of the present invention will be described in detail.

As mentioned previously, a rolling bearing according to the present invention comprises a rolling element formed of a steel containing 0.9 to 1.1 wt. % C, 0.1 to 0.5 wt. % Si, 0.2 to 0.8 wt. % Mn, 1.0 to 1.8 wt. % Cr, with the balance being Fe and inevitable impurities. At least the surface of the rolling element; namely, the surface of a finished rolling bearing, includes carbides having an area fraction of 5% to 15%. Of these carbides, carbides having an averaged particle diameter of 0.5 μm or more share 50% or more of the area fraction of all the carbides. Further, of the foregoing carbides, carbides having an averaged particle diameter of 1 μm or more share 2% or less of the area fraction of all the carbides. Still further, the rolling element has a surface hardness HV of 750 to 900.

An explanation will be hereinbelow given of why the extent of components of the rolling bearing.

(1) C

C (carbon) is an element used for ensuring the hardness and carbides required by a bearing. The rolling bearing must include 0.9% or more carbon in order to ensure the hardness which is sufficient to ensure the life of the bearing, as well as the area fraction of carbides. If the content of C exceeds 1.1%, macro carbides will be generated at time of a steel-milling operation, or segregation will become stronger. In such a case, the generation of macro carbides or segregation may not be sufficiently controlled by a soaking operation which is usually performed for SUJ2 material. As a result, carbides become insufficiently refined in a precision warm rolling process following the soaking process. For these reasons, the content of C is limited to 0.9 to 1.1 wt. %. In a case where the refining of carbides performed in a warm rolling process is controlled more strictly, the content of C should preferably be set to 0.95 to 1.05 wt. %.

(2) Si

When used as a deoxidizer at the time of steel-milling of material, Si (silicon) improves the hardenability of the material, as well as strengthening a martensite matrix. Therefore, silicon is an element effective for improving the life of a bearing. At least 0.1 wt. % Si is required to ensure the foregoing effects. In contrast, if the content of Si is too high, the workability of the material including machinability or forging characteristics is deteriorated. For this reason, the upper limit of the content of Si is set to 0.5 wt. %. In short, the content of Si is set to 0.1 to 0.5 wt. %, and more preferably to 0.15 to 0.35 wt. %.

(3) Mn

Mn (manganese) is an element which improves the hardenability of material. At least 0.2 wt. % Mn is necessary to ensure such an effect. Mn strengthens the ferrite of material. If the content of Mn is too high, the workability of the material is decreased. For this reason, in the embodiments in which the amount of carbon included in material is particularly large, the upper limit of the content of Mn is set to 0.8 wt. %. More specifically, the content of Mn is set to 0.2 to 0.8 wt. %. Mn tends to render a crystal grain bulky at the time of a heating operation, decreasing the index of cleanliness of steel which is important for the bearing. For this reason, the content of Mn is preferably set to 0.25 to 0.5 wt. %.

(4) Cr

Cr (chromium) is an important element which is used for ensuring the hardness and carbides required by a bearing, which improves the hardenability of and the resisting property for temper softening of material, and which strengthens a martensite matrix. At least 1.0 wt. % or more Cr is necessary to ensure the hardness sufficient to achieve the longer life of and the area fraction of carbides. If the content of Cr exceeds 1.8 wt. %, macro carbides will be generated at time of a steel-milling operation, or segregation will become stronger. In such a case, the generation of macro carbides or segregation may not be sufficiently controlled by a soaking operation which is usually performed for SUJ2 material. As a result, carbides become insufficiently refined in a precision warm rolling process following the soaking process. For these reasons, the content of Cr is limited to 1.0 to 1.8 wt. %. In a case where the refining of carbides performed in a warm rolling process is controlled more strictly, the content of Cr should preferably be set to 1.30 to 1.60 wt. %.

(5) The Area Fraction of Carbides on the Surface

The wearing of a needle bearing, which bearing serves as a rolling bearing, is contact wear caused by the deficiency of a lubricant or sliding wearing of a rolling element. In general, it is known that a larger surface hardness HV value is effective in terms of wearing resistance, and that a larger amount of carbides precipitated on a wearing surface is effective in terms of wearing resistance.

Figure 3:
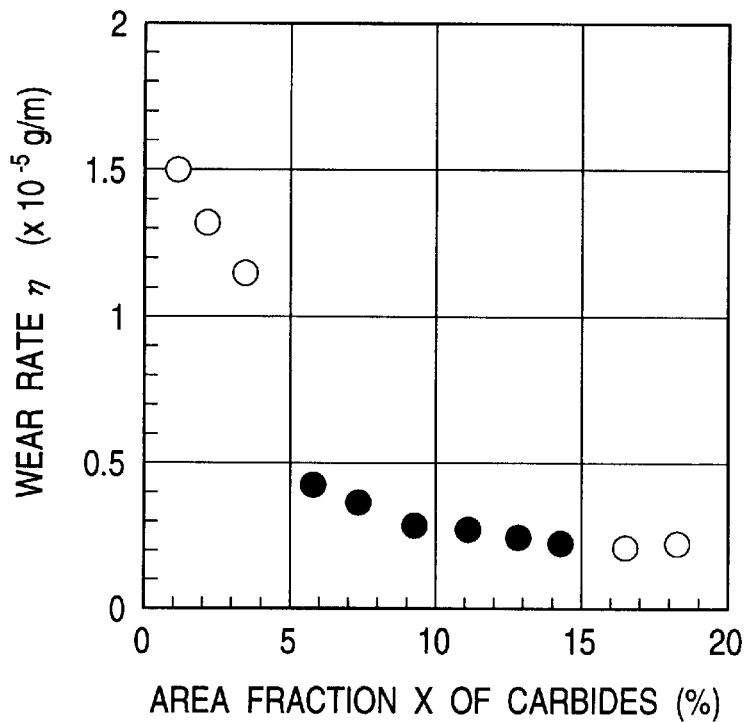
FIG. 3 is a plot of wearing which shows the relationship between the area fraction X of carbides and a wear rateη.

FIG. 3 is a plot of wearing which shows the relationship between the area fraction X of carbides and a wear rate η in a case where there is a lubrication failure. As is evident from FIG. 3, it is acknowledged that the wear rate η significantly decreases when the area fraction X of carbides exceeds 5%, and the wearing resistance of a bearing is improved.

Figure 4:
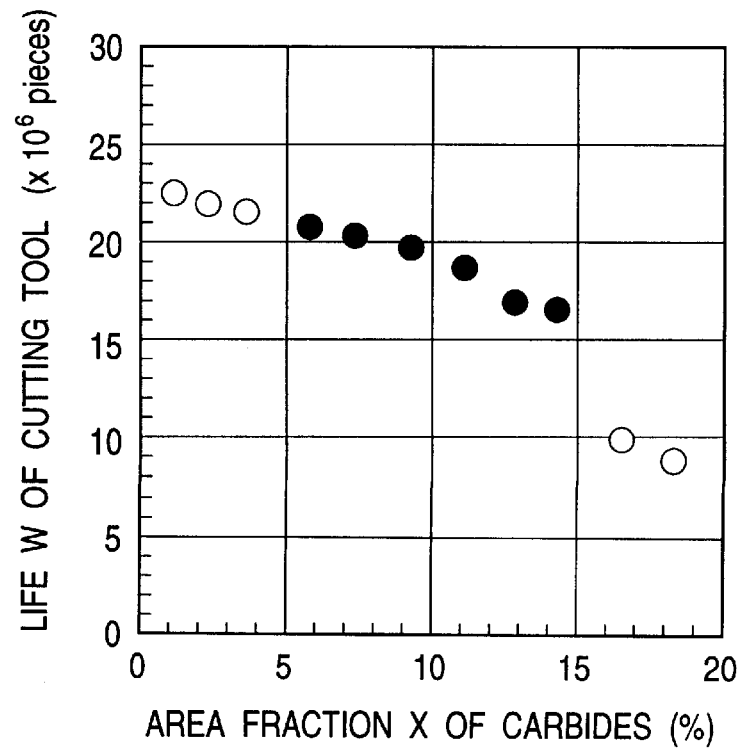
FIG. 4 is a plot of machining which shows the relationship between the area fraction X of carbides and the life W of a cutting tool.

In contrast, a needle roller incorporated into a bearing is usually manufactured by cutting coiled material. FIG. 4 is a plot of machining which shows the relationship between the area fraction X of carbides and the life W of a cutting tool. As is evident from FIG. 4, it is acknowledged that the life W of a cutting tool extremely decreases when the area fraction X of carbides exceeds 15%.

Even in the case of a ball bearing, the wearing resistance is the important property. Wearing may occur as a result of a lubrication failure or of the spin-sliding of balls. For this reason, even in the case of a ball bearing, the area fraction X of carbides must be set to 5% or more, as in the case of a needle bearing. The rolling element of the ball bearing is usually manufactured from coiled material through a header-machining operation. If the area fraction X of carbides exceeds 15%, the life W of a cutting tool extremely decreases, as does a needle bearing.

Figure 5:
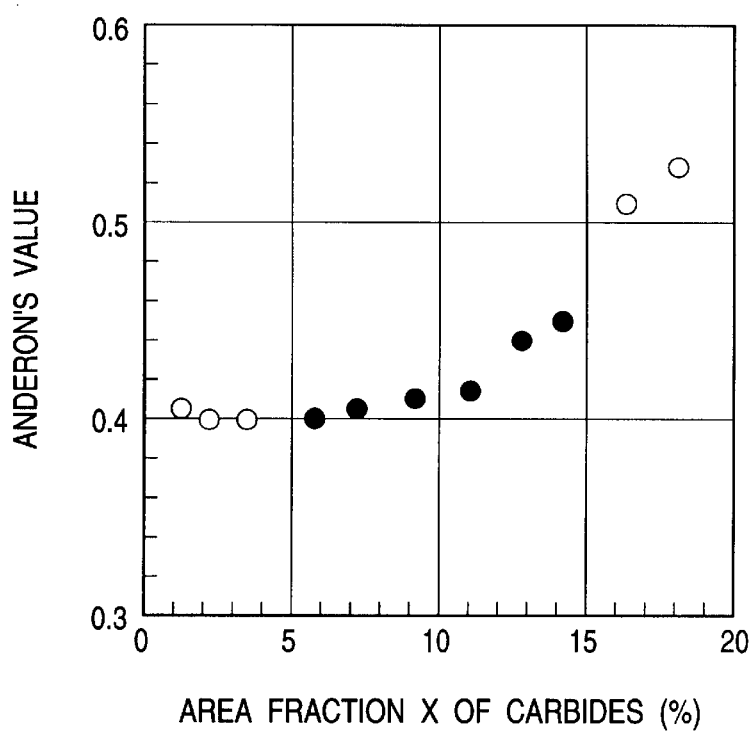
FIG. 5 is a plot of acoustic characteristic which shows the relationship between the area fraction X of carbides and an Anderon's value A.

FIG. 5 is a plot of acoustic characteristic which shows the relationship between the area fraction X of carbides and the acoustic characteristics of the ball bearing. In the drawing, the Anderon's value represents the noise of a bearing in the form of vibrating component and is measured at the Hi band (1,800 Hz to 10,000 Hz).

As mentioned previously, the refining of carbides is important for the ball bearing that requires the superior acoustic characteristics. In contrast, as is evident from FIG. 5, if the area fraction X of carbides exceeds 15% (or more preferably 12%), the Anderon's value will increase, thereby deteriorating the acoustic characteristics of the bearing.

In the principle of the invention, the area fraction X of carbides on the surface is limited to 5 to 15% in order to satisfy all the factors; namely, wearing resistance, the life W of a cutting tool, and the acoustic characteristics of a bearing. In order to ensure sufficient wearing resistance and workability, the area fraction X of carbides is preferably set to 9 to 12%, as is evident from FIGS. 3 through 5.

(6) Area Fraction of Carbides Having an Averaged Particle Diameter of 0.5 $\mu$m or less Surface damage, such as sliding wearing or peeling, which is received by a rolling bearing as a result of a lubrication failure or the mixing of wear dust into a lubricant is thought to be caused by an inner-outer race coming into metal-to-metal contact with the rolling element due to the deficiency of a lubricant while the bearing is in use. Surface damage tends to be proportional to the wearing characteristics of the bearing. In a case where the wearing characteristics of a bearing are suitable, surface damage tends to become slight. However, the surface damage cannot be solved by examination of only such wear rate.

As a result of observation of the state of surface damage through a bearing test, the inventors of the present invention have acknowledged that fine cracks occurred in the surface of the bearing as a result of the sliding action of a roller or of the metal-to-metal contact of the rolling element, and that the surface was peeled off as a result of progress of the cracks.

The minute precipitation of carbides contributes to the refining of an organization or the strengthening of a matrix, as well as to a reduction in the clearance of a matrix on which no carbides are precipitated. A hardness measuring device which measures the Picker's hardness of material converts the plastic deformation characteristics of a substance to be measured into hardness. The thus-obtained hardness represents the state of carbides precipitated on the matrix. Although the surface damage is caused by microscopic metal-to-metal contact between the inner-outer race and the rolling element, the metal-to-metal contact may arise in the clearance of the matrix on which no carbides are precipitated. Such a microscopic area has low wearing resistance and peeling resistance, thereby resulting in a high risk of fine cracks.

According to the principle of the present invention, the clearance susceptible to surface damage is reduced to as small an area as possible by minute precipitation of carbides, whereby a bearing having longer life is accomplished.

In order to accomplish the bearing having such longer life, the area fraction of carbides having an averaged particle diameter of 0.5 $\mu$m or less must be increased to 50% or more of the area fraction of all carbides. In order to ensure a further sufficiently longer life of a bearing, the area fraction of the carbides having an averaged particle diameter of 0.5 $\mu$m or less should preferably be set to 70% or more of the area fraction of all the carbides.

The noise of a ball bearing can be reduced by refining of carbides precipitated on the surface of a rolling element to thereby prevent formation of "waviness." To accomplish a desired object, it is necessary to increase the area fraction of the carbides having an averaged particle diameter of 0.5 $\mu$m or less to 50% or more of the area fraction of all the carbides. In order to ensure a further sufficiently longer life of the bearing, the area fraction of the carbides having an averaged particle diameter of 0.5 $\mu$m or less should preferably be set to 70% or more of the area fraction of all the carbides.

From the foregoing viewpoints, according to the principle of the present invention, the area fraction of the carbides having an averaged particle diameter of 0.5 $\mu$m or less is set to 50% or more, and more preferably to 70% or more.

(7) Area Fraction of Carbides Having an averaged particle Diameter of 1 $\mu$m or more As mentioned previously, the clearance susceptible to surface damage is reduced to as small an area as possible by increasing the area fraction of the carbides having an averaged particle diameter of 0.5 $\mu$m or less to 50% or more of the area fraction of all the carbides. However, in some cases, a part of minute carbides becomes partially coagulated into a comparatively large size. The life of these carbides that have coagulated into a larger size is drastically shortened by surface damage.

In order to ensure the longer life of carbides against surface damage, it is necessary to reduce the area fraction of the carbides having an averaged particle diameter of 1 $\mu$m or more to 2% or less of the area fraction of all the carbides by controlling the conditions of annealing or hardening. In order to ensure a further sufficiently longer life of the bearing, the area fraction of the carbides having an averaged particle diameter of 1 $\mu$m or more is reduced to 1% or less of the area fraction of all the carbides.

As mentioned previously, the acoustic characteristics of the ball bearing are dependent on the "waviness" of the surface of the rolling element. If a part of the minute carbides becomes coagulated and bulky to thereby form carbides of a comparatively large size, "waviness" arises in these bulky carbides. Oscillation develops in the area of the carbides where the "waviness" is occurring, thereby deteriorating the acoustic characteristics of the bearing.

For these reasons, in order to ensure the desired acoustic characteristics of the bearing, it is necessary to reduce the area fraction of the carbides having an averaged particle diameter of 1 $\mu$m or more to 2% or less of the area fraction of all the carbides by controlling the conditions of annealing or hardening. In order to ensure a further sufficiently longer life of the bearing, the area fraction of the carbides having an averaged particle diameter of 1 $\mu$m or more is reduced to 1% or less of the area fraction of all the carbides.

From the foregoing viewpoints, according to the principle of the present invention, the area fraction of the carbides having an averaged particle diameter of 1 $\mu$m or more is reduced to 2% or less, or more preferably 1% or less, of the area fraction of all the carbides.

(8) Surface Hardness HV

Minute precipitation of carbides contributes to a refined organization or a strengthened matrix, thereby resulting in a tendency toward an increase in surface hardness HV. Even if a rolling bearing is subjected to the same heat treatment as that to which a conventional rolling bearing is subjected, the value of surface hardness HV is increased, thereby simultaneously allowing realization of the refining of carbides and an increase in the surface hardness HV.

The surface hardness HV is an important factor with respect to wearing resistance or peeling resistance. Even in a case where carbides are minutely precipitated on the surface of the bearing, the life of the bearing is extremely shortened if the overall surface hardness HV of the bearing is decreased.

From the result of the life test which is performed, from the foregoing viewpoints, on the assumption that there are a lubrication failure and the mixing of wear dust into a lubricant, it has been found that desired longer life cannot be obtained at a surface hardness HV of less than 750.

In contrast, in a case where the value of surface hardness HV is increased by means of the conditions of heat treatment, such as quick heating or high-frequency heating, or a cooling method, such as a water quenching treatment or a subzero treatment, while carbides are minutely precipitated on the bearing, the bearing tends to have longer life. However, it has been found that if the surface hardness HV of the bearing exceeds 900, the toughness of the matrix drastically drops, thereby shortening the life of the bearing.

For these reasons, according to the principle of the present invention, the surface hardness HV of the bearing is limited to 750 to 900. In order to stably ensure a strengthened matrix, the surface hardness HV of the bearing should preferably be set to 770 to 850.

(9) Others

Steel may contain inevitable elements of impurities, as well as C, Si, Mn, and Cr mentioned previously. Of these elements of impurities, O (oxygen) and Ti (titanium) are important elements. O and Ti are elements which decrease the index of cleanliness of steel of a bearing. Particularly, O produces an oxide-based non-metallic inclusion which has a deleterious effect on rolling life, and hence the percentage content of O is preferably reduced to 15 ppm or less. If greater emphasis is placed on the rolling life, the percentage content of O should preferably be reduced to 10 ppm or less. In contrast, Ti reacts with N (nitrogen) contained in steel to form TiN. TiN has a deleterious effect on rolling life, as has the oxide-based non-metallic inclusion. Further, in terms of the form of TiN included in steel or the relationship between TiN and the hardness of steel, TiN tends to deteriorate the acoustic characteristics of rolling bearing. For this reason, the percentage content of Ti is preferably reduced to 60 ppm or less. If emphasis is placed on the acoustic characteristics of rolling bearing, the percentage content Ti should preferably be reduced to 40 ppm or less. In order to completely eliminate acoustic degradation attributable to Ti, the percentage content of Ti should preferably be reduced to 20 ppm or less.

Next, the method of manufacturing a rolling bearing according to the present invention will be described.

Figure 6:
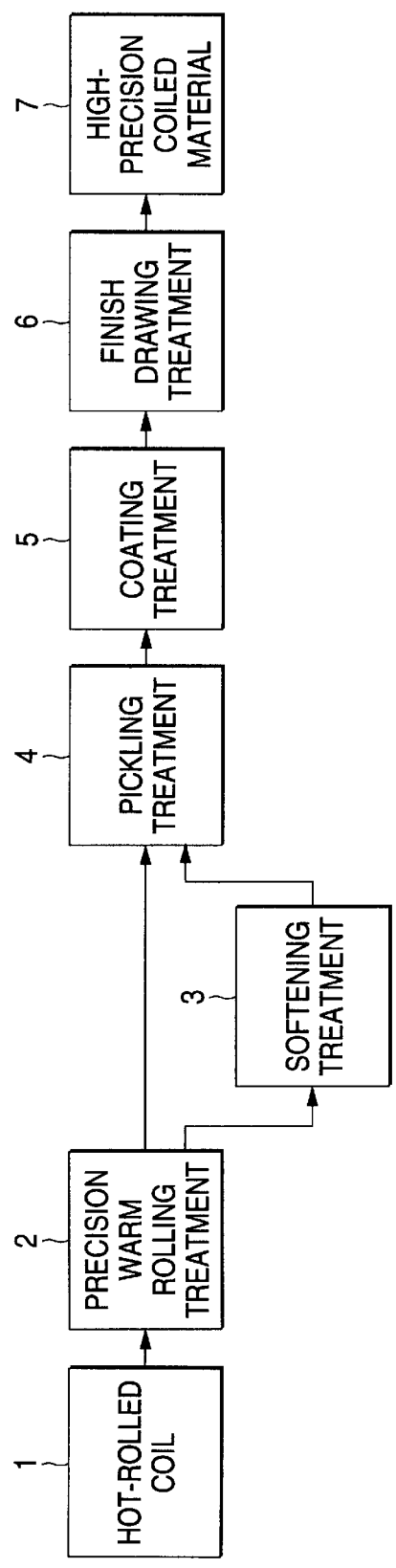
FIG. 6 is a diagrammatic representation showing the steps of manufacturing coiled material which is used as material for a needle roller of a rolling bearing.

FIG. 6 is a diagrammatic representation showing the steps of manufacturing coiled material which is used as material for a needle roller of a rolling bearing.

First, a hot-rolled coil material 1 manufactured through a hot rolling process is subjected to a precision warm rolling process 2.

While being refined, plate-like carbides contained in perlite and reticulate carbides are spheroidized in the precision warm rolling process 2. In order to increase a spheroidizing rate of the perlitic organization, the heating conditions must be set. However, to prevent undissolved residual perlite, the steel must be subjected to a warm rolling treatment at a temperature of 600° C. or more. In contrast, if there is an excessive increase in the temperature of the steel, the steel undergoes austenitic transformation, so that perlite is reproduced. For this reasons, the steel must be subjected to a warm rolling treatment at a heating temperature of 820° C. or less.

In order to reduce the post-cooling hardness of the steel, the rate at which the steel is cooled after having undergone the warm rolling treatment must be controlled in such a way that the steel is slowly cooled. The cooling rate is desirably reduced to a minimum. In order to soften the steel to such an extent that the steel can be subjected to a finish drawing treatment, the cooling rate must be set to 5° C./sec. or less. However, in terms of productivity and economy, the cooling rate must be set to 1° C./sec. or more.

For the foregoing reasons, the heating conditions used in the precision warm rolling process 2 are limited to 600 to 820° C., and the cooling rate is limited to 1 to 5° C./sec. Depending on the heating conditions and the cooling rate, a softening process 3, which will be described later, can be omitted. Conditions required to omit the softening process 3 comprise the heating conditions ranging from 680 to 780° C. and the cooling rate ranging from 1 to 3° C./sec.

After having finished undergone the precision warm rolling process 2 in the manner mentioned previously, the steel proceeds to a pickling process 4 directly or by way of the softening process 3 according to the heating conditions and the cooling rate mentioned previously.

There is the following reason for the need of sending the steel to the softening process 3 depending on the heating conditions and the cooling rate.

There are many small-sized needle rollers for use with rolling bearings or small-sized ball bearings required to satisfy the acoustic characteristics, and coiled material used for manufacturing these rollers or bearings is narrow raw material having a diameter of 2 mm or less. For this reason, even if a working rate, a heating temperature, and a cooling rate are precisely controlled in the precision warm rolling process 2, the surface hardness of the coiled material obtained after the precision warm rolling process 2 may become too hard, thereby making it difficult to send the coiled material to a finish drawing process 6, which will be described later. If the temperature at which the coiled material is annealed is too high, or if the coiled material is annealed for a long period of time, a spheroidized organization becomes bulky. To prevent this problem, the annealing temperature is set to a minimal temperature in order to soften the coiled material to such an extent that the coiled material can be subjected to a drawing treatment. Further, the coiled material must be annealed in a short time. To minimize the extent to which carbides become bulky, the annealing temperature should preferably be set to a temperature less than 700° C. which is lower than transformation temperature $A_1$. Further, desirable heating time is less than five hours.

After having undergone the foregoing processes, the coiled material proceeds to the known processes: namely, the pickling process 4, a coating process 51 and the finish drawing process 6, whereby high-precision coiled material 7 is manufactured.

Figure 7:
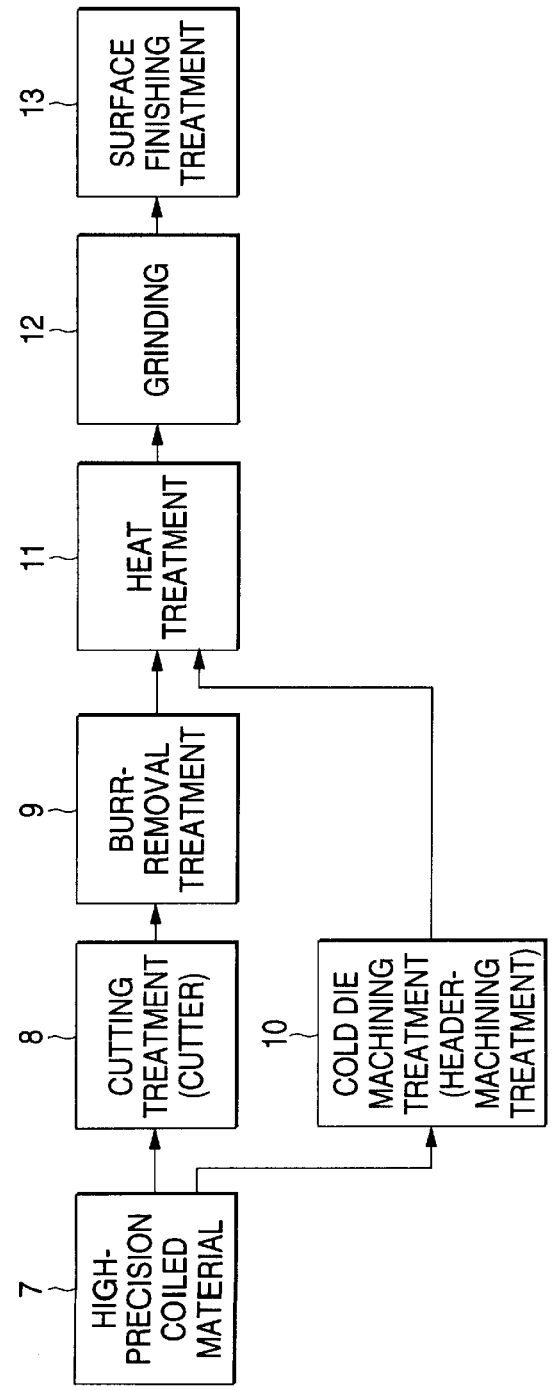
FIG. 7 is a flow chart showing the process of manufacturing a needle roller of a rolling bearing.

As shown in FIG. 7, the high-precision coiled material 7 is worked into a needle through machining operations carried out in a cutting process 8 and a burr-removal process 9. The material 7 is worked into a roller through a cold die machining process (i.e., a header-machining process) 10. Through given hardening and tempering processes such as a heating process 11, a grinding process 12, and a surface finishing process 13, the needle or the roller is formed into a finished product; namely, a rolling bearing which uses a needle roller. A note that a rolling element of a ball bearing is usually manufactured through the cold die machining process (i.e., a header-hardening process) 10.

As mentioned previously, in the principle of the present invention, the durability and acoustic characteristics of the rolling bearing are improved by means of the organization of material and the distribution of carbides. The bearing is subjected to a surface treatment, such as a carburizing treatment or a carbonitriding treatment, or surface processing such as a barrel treatment or a shot peeling treatment, whereby the surface hardness HV, the surface compression residual stress, or the surface roughness of the bearing can be controlled. Further, a rolling bearing having improved durability can be manufactured.

With regard to the acoustic characteristics of the ball bearing, there are two cases; namely, a case where the bearing itself produces noise in its initial state, and a case where the noise produced by the ball bearing becomes worsen while the ball bearing is in use.

The noise produced by the ball bearing in its initial state is also dependent on the clearance of the bearing, the precision of machining, or the surface roughness. In a case where these conditions are standardized (to e.g., the fifth grade or more conditions specified by JIS G 1514) at the time of manufacturing a bearing, the noise produced by the ball bearing at its initial state is primarily attributable to the fact that minute impressions are formed in a bearing ring as a result of a rolling element being pressed against the bearing ring at the time of fitting the bearing ring into the ball bearing. Further, the acoustic degradation caused while the ball bearing is in use is primarily attributable to the fact that minute impressions are formed in the areas of the rolling element and the bearing ring where they come into contact with each other when preload is held for a long period of time in a specific condition or when impact load is applied to the ball bearing. In either case, the acoustic characteristics of the ball bearing are degraded by minute impressions. The generation of these minute impressions is dependent on the surface hardness of the ball bearing or the organization of steel. Particularly, the generation of minute impressions is greatly dependent on the amount of residual austenite contained in steel. If the amount of residual austenite exceeds 6%, minute impressions are apt to be formed, resulting in acoustic degradation in the initial state, or during the course of use, of the ball bearing.

Consequently, in the case of the rolling bearing according to the present invention, the amount of residual austenite contained in steel is desirably reduced to 6% or less. In the case of a rolling bearing which is required to prevent acoustic degradation when in the initial state of the use/operation or which is used in the environment where the rolling bearing is required to satisfy sever acoustic characteristics, the amount of residual austenite is desirably reduced to 2% or less.

The hardness of the rolling element also has an effect on the acoustic characteristics of the ball bearing, and hence the surface roughness of the rolling element is preferably set to 3 $\mu$m or less RMS. After having undergone a hard facing treatment subsequent to a heat treatment, the rolling element is desirably subjected to a tempering process again.

[Experimental Procedure]

In order to arrive at and confirm the above mentioned rolling element composition, various experiments were conducted. The procedure and results of two of the experiments are detailed below.

[First Experiment]

First, the inventors of the present invention have determined the relationship between the area fraction X and wear rate $\eta$ of carbides precipitated on the surface of a needle bearing and life W of a cutting tool.

The area fraction X of carbides is calculated by the steps of: photographing the organization of the surface of the bearing through use of an electron microscope; extraction of carbides from the images photographed by the electron microscope through use of an image analyzer; and measurement of the shape, area, and number of the carbides. The electron microscope and the image analyzer, both being given below, are used in the calculation.

Electron Microscope: JSM-T220A manufactured by Nihon Denshi Co.

Image Analyzer: IBAS2000 manufactured by Carl Zeiss Co.

Figure 8A:
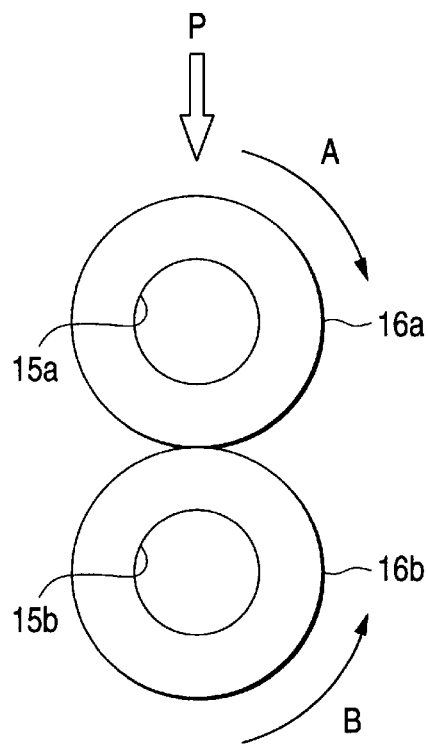
FIGS. 8A and 8B show the outline of a dual-cylinder abrasion tester.
Figure 8B:
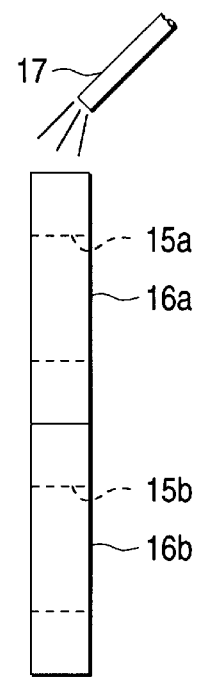

Next, the wear rate $\eta$ is measured through use of a dual-cylinder abrasion tester. More specifically, as shown in FIGS. 8A and 8B, the dual-cylinder abrasion tester comprises a pair of cylinders (i.e., a first cylinder 15$a$ and a second cylinder 15$b$) which are arranged so as to be opposite to and held in alignment with in a vertical direction. Rolling elements 16$a$, 16$b$ are fitted around the first and second cylinders 15$a$, 15$b$, respectively. Given load P is exerted on the first cylinder 15$a$ from above, whereby the first and second cylinders 15$a$, 15$b$ are brought into contact with each other. While a lubricant is poured to the rolling element 16$a$ from a hose 17, the first cylinder 15$a$ is rotated at low speed in the direction designated by arrow A and the second cylinder 15$b$ is rotated at low speed in the direction designated by arrow B. A slip factor of the cylinders is set to a given value, the first cylinder 15$a$ is set so as to differ from the second cylinder 15$b$ in the number of revolutions, to thereby calculate a mean wear rate$d$ (g/m) of the rolling elements 16$a$, 16$b$. In the first experiment, in order to reproduce the wearing characteristics of the bearing particularly when the bearing is in the state of lubrication failure, there is used a lubricant which has a low degree of viscosity and is apt to cause the first and second cylinders 15$a$, 15$b$ to lack lubricant while the cylinders are rotating.

Conditions for the abrasion test are as follows:

[Condition for Abrasion Test]

Tester: a dual-cylinder abrasion tester
Load P: 100 kgf
Number of Revolutions of the first cylinder 15$a$: 10 r.p.m.
Slip Factor: 30%
Lubricant: Spinox 10 (manufactured by Nippon Sekiyu Co.)
Viscosity: ISOVG10
Oil Temperature: 60° C.

Next, a test was carried out with regard to the cutting characteristics of a cutting tool (i.e., a cutting jig) used in manufacturing coiled material. A needle roller is usually manufactured by cutting coiled material. If the area fraction X of carbides is set to a too great value, the cutting tool wears out, thereby deteriorating the cutting characteristics of the cutting tool. For this reason, the area fraction X of carbides must be determined in consideration of the cutting characteristics of the cutting tool.

In the first experiment, the life W of the cutting tool was measured through use of a vertically-slidable cutter commonly used in manufacturing a needle roller, and the cutting characteristics of the cutting tool were evaluated.

Figure 9:
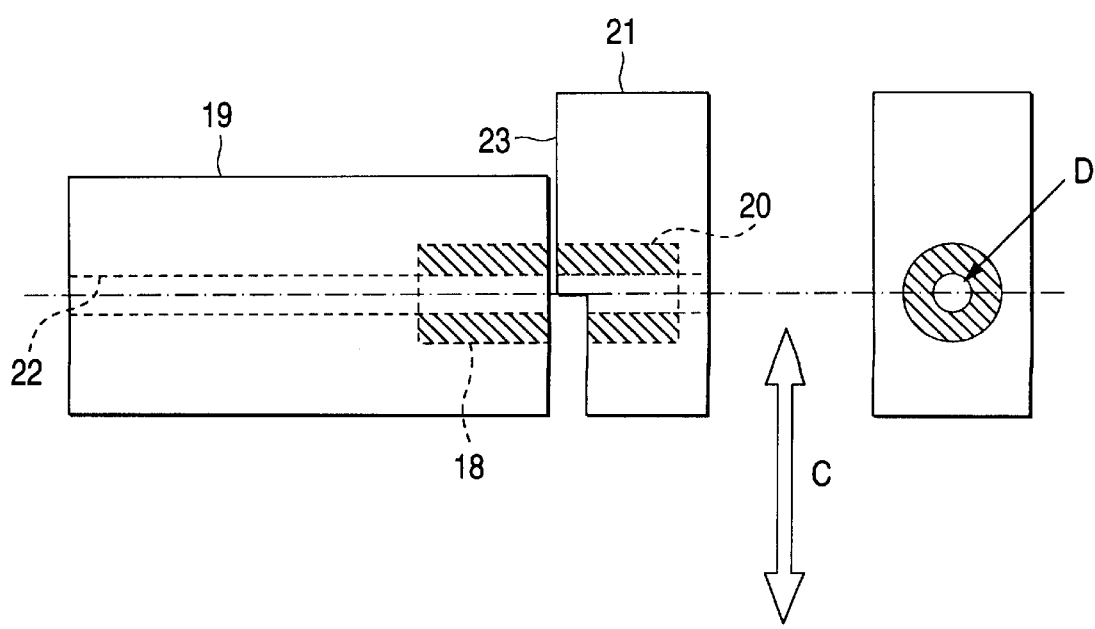
FIG. 9 is a schematic representation showing the outline of a vertically-slidable cutter.

As shown in FIG. 9, the vertically-slidable cutter comprises a die 19 to the tip end of which a cemented carbide die 18 is attached and a cutting tooth 21 to the tip end of which a cemented carbide cutting die 20 is attached. The die 19 and the cutting tooth 21 are arranged so as to be opposite to each other. Coiled material is inserted into an insert slot 22 and is cut by vertically moving the cutting tooth 21 in the direction designated by arrow C.

Figure 10A:
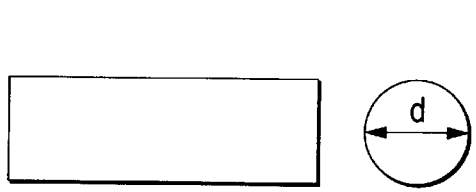
FIGS. 10A and 10B are schematic representations for illustrating how the cut cross section of coiled material changes as a cutting tool wears out.
Figure 10B:
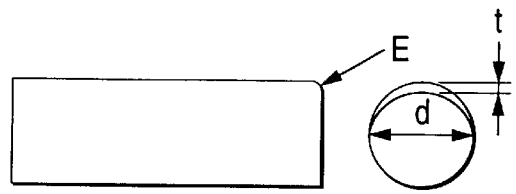

As shown in FIG. 10A, when the cemented carbide cutting die 20 is in its initial state, it is possible to obtain coiled material which has complete roundness and a diameter "d." However, as the coiled material inserted into the insert slot 22 is continually cut, the cemented carbide cutting die 20 provided on the cutting surface of the cutting tooth 21 wears out (reference symbol D shown in FIG. 9 designates the worn-out area of the die). As a result, as shown in FIG. 10B, the edge E of the coiled material is rounded, thereby resulting in a so-called "die wear." The "die wear"of the cross section of the coiled material affects the profile of a finished rolling element. For this reason, the amount of die wear "t" must be reduced to 10% or less of the diameter "d" of the coiled material. More specifically, if the amount of die wear "t" exceeds 10% of the diameter "d," it is necessary to grind a cut surface 23 of the cutting tooth 21 so as to remove the worn-out area D. Because of this, the cutting characteristics of the cutting tooth were evaluated, taking as the life W the life of the cutting tool when the amount of die wear "t" reaches 10% of the diameter "d."

The life of the cutting tool was tested under the following conditions.

[Cutting Tool Life Test]
Tester: Vertically-slidable cutter
Die: V30 (JIS B 4053)
Coiled Line Diameter: φ3.2
Rate of Working: 1,000 to 1,200 pieces/min.
Lubricant: Zinc Phosphate Coating+Lubricant TABLE 1 shows the result of measurement of the area fraction X and wear rate η of carbides and the life W of the cutting tool.

TABLE 1

|  | No | Area Fraction X of Carbides (%) | Wear Rate η (g/m) | Life W of a Cutting Tool (× $10^6$ pieces) |
|---|---|---|---|---|
| Embodi- | 1 | 5.8 | 0.43 | 21.0 |
| ments | 2 | 7.3 | 0.37 | 20.5 |
|  | 3 | 9.4 | 0.29 | 20.0 |
|  | 4 | 11.2 | 0.27 | 18.9 |
|  | 5 | 12.9 | 0.25 | 17.0 |
|  | 6 | 14.3 | 0.22 | 16.5 |
| Compara- | 11 | 1.2 | 1.5 | 22.5 |
| tive | 12 | 2.2 | 1.32 | 21.9 |
| Examples | 13 | 3.5 | 1.15 | 21.6 |
|  | 14 | 16.5 | 0.21 | 10.0 |
|  | 15 | 18.3 | 0.22 | 9.0 |

In TABLE 1, No. 1 to No. 6 designate embodiments of the present invention, and No. 11 to No. 15 designate comparative examples.

As is evident from TABLE 1, as the area fraction X of carbides becomes greater, the wear rated becomes smaller. It is found that the area fraction X of carbides be desirably increased only in terms of an improvement in wearing resistance. In short, in all of the comparative examples No. 11 to No. 13 in which the area fraction X of carbides represents 5% or less, the wear rate η represents a value of greater than 1 (g/m). In contrast, in all of the comparative examples in which the area fraction X of carbides represents 5% or more, the wear rate η represents a value of less than 0.5 (g/m).

With regard to the life W of the cutting tool, in the comparative examples Nos. 14 and 15 in which the area fraction X of carbides represents 15% or more, it is found that the life W of the cutting tool is considerably decreased, thereby resulting in the deterioration of the cutting characteristics of the cutting tool. Consequently, from these results, it is necessary to set the area fraction X of carbides to the range of 5 to 15%. Particularly, in the embodiments Nos. 3 and 4 in which the area fraction X of carbides is set to the range of 9 to 12%, there are obtained superior measurement results with regard to both the wear rate η and the life W of the cutting tool.

Next, the inventors of the present invention measured the surface hardness Hv of coiled material with respect to the area fraction of carbides having an averaged particle diameter of 1 μm or more, as well as to the area fraction of carbides having an averaged particle diameter of 0.5 μm or more, and the life $RL_{10}$ of a radial shaft and the life $SL_{10}$ of a thrust shaft of the bearing (i.e., the needle bearing).

The area fraction X' of carbides having an averaged particle diameter of 1 μm or more and the area fraction X" of carbides having an averaged particle diameter of 0.5 μm or more are determined by controlling the component of coiled material to be used as raw material, conditions concerning softening and annealing, the number of times the coiled material is annealed, hardening conditions, etc.

In the present embodiment, in a case where high-precision coiled material 7 is manufactured from hot-rolled coiled material 1 in a raw-material manufacturing process shown in FIG. 6, the material is manufactured via the softening process 3. More specifically, the hot-rolled coiled material is held at a temperature of 650 to 700° C. for two to five hours. The coiled material is then subjected to a low-temperature softening treatment at a cooling rate of 30 to 100° C./hr. until the temperature of the coiled material decreases to 500° C., whereby the samples according to the embodiment of the present invention are manufactured.

In contrast, the comparative examples are manufactured through the conventional raw-material manufacturing process and are subjected to a spheroidizing treatment in a softening process 52 after having undergone a precision cold rolling process 57 (see FIG. 6). In short, the coiled material that has undergone the precision cold rolling process 57 is held at a temperature of 750 to 830° C. for three to seven hours. The material is then subjected to a spheroidizing treatment at a cooling rate of 10 to 40° C./hr. until the temperature of the material decreases to a temperature of 550 to 650° C. The samples that have undergone the spheroidizing treatment are taken as comparative samples.

The samples of the present invention embodiments and the comparative samples thus manufactured are subjected to a heat treatment, and the surface hardness HV of the samples is measured. In short, after having been held at a temperature of 830 to 860° C. for half-hour to one hour, the high-precision coiled material is subjected to a hardening treatment. Subsequently, the material is subjected to a tempering treatment at a temperature of 160 to 200° C. for two hours. Thereafter, the surface hardness HV of the material is measured, and the life $RL_{10}$ of a radial shaft and the life $SL_{10}$ of a thrust shaft of the bearing are measured.

In the measurement of the life of the bearing, the test must be conducted on the assumption that an automatic transmission fluid of DEXRON II (in compliance with the automatic transmission fluid standards of GM Co.) is used as the automobile lubricant which is apt to cause surface damage to a bearing. To this end, according to the first embodiment, gear oil specifically designed for automatic transmission purpose is used as a lubricant, and minute foreign articles are mixed into the lubricant in order to reproduce the harsh lubrication condition where surface damage is apt to arise. Under these conditions, the life of the bearing was evaluated.

In the bearing life test, vibrations are measured at load positions, and a test bearing is examined when there arise oscillations which are three times as large as the value of initial oscillation. If there are peeling or abnormal wearing occurred in the bearing, the bearing is judged to have expired its life. A Weibull distribution plot is prepared on the basis of the duration of endurance of the bearing, and the life RL of a radial shaft and the life $SL_{10}$ of a thrust shaft of the bearing are measured on the basis of respective Weibull distribution patterns. Conditions for the radial bearing life test and for the thrust bearing life test are as follows:

[Life Test Conditions for Radial Needle Bearing]
Test Bearing Stress: Maximum of 2,300 Mpa
Number of Revolutions: 6,800 r.p.m.
Lubricant: Castle Auto Fluid D-II (Toyota Co.)
Temperature of Lubricant: 100° C.
Foreign Articles to be mixed:
Composition: Fe3C (Cementite)-based powder
Rockwell Hardness: HRC 60

Particle Diameter: 50 μm or less

Amount of Foreign Articles to be mixed: 300 ppm foreign articles mixed into a lubricant

[Life Test Conditions for Thrust Needle Bearing]
  Test Bearing Stress: Maximum of 2,300 Mpa
  Number of Revolutions: 6,800 r.p.m.
  Lubricant: Castle Auto Fluid D-II (Toyota Co.)
  Temperature of Lubricant: 100° C.
  Foreign Articles to be mixed:
  Composition: Fe3C (Cementite)-based powder
  Rockwell Hardness: HRC 60
  Particle Diameter: 50 μm or less
  Amount of Foreign Articles to be mixed: 300 ppm foreign articles mixed into a lubricant TABLE 2 shows the results of measurement of the surface hardness HV of the bearing and the life $RL_{10}$ of a radial shaft of and the life $SL_{10}$ of a thrust shaft of the bearing.

bearing resulting from refining of carbides has the effect of protecting the bearing from surface damage. In the comparative example No. 35, only the surface hardness HV of the bearing is reduced by changing the conditions for heat treatment. When the surface hardness HV is decreased to 750 or less, the life of the bearing is sharply decreased. In contrast, in a case where the surface hardness HV of the bearing is increased to 900 or more while the carbides are broken into a refined state such as that represented by the comparative example No. 36, the toughness of the matrix is sharply decreased. Hence, it is found that the bearing is susceptible to surface damage, and the life of the bearing is decreased. In contrast, in the embodiments No. 21, No. 24, and No. 26 in which the surface hardness HV is 750 to 900, the matrix is in a stable state. Therefore, it is known that the bearing tends to exhibit longer life.

From the foregoing descriptions, there is found a great improvement in the durability of the bearing wherein the

TABLE 2

| No | Area of Fraction X' of Carbides having a mean particle diameter of 1 μm or more (%) | Area of Fraction X" of Carbides having a mean particle diameter of 0.5 μm or less (%) | Surface Hardness (HV) | Life of Radial Bearing $RL_{10}$ (time) | Life of Thrust Bearing $SL_{10}$ (time) |
| --- | --- | --- | --- | --- | --- |
| Embodiments | | | | | |
| 21 | 0.3 | 72 | 778 | 54.4 | 50.1 |
| 22 | 1.5 | 68 | 768 | 46.1 | 45.3 |
| 23 | 1.1 | 55 | 764 | 47.2 | 44.9 |
| 24 | 0.9 | 85 | 775 | 55.2 | 51.8 |
| 25 | 1.3 | 65 | 754 | 46.0 | 44.8 |
| 26 | 0.5 | 78 | 838 | 54.9 | 50.6 |
| 27 | 1.2 | 69 | 856 | 48.7 | 46.3 |
| Comparative Examples | | | | | |
| 31 | 2.5 | 60 | 761 | 13.2 | 12.6 |
| 32 | 3.2 | 52 | 759 | 10.9 | 10.3 |
| 33 | 1.2 | 45 | 772 | 14.3 | 13.8 |
| 34 | 1.5 | 30 | 758 | 11.2 | 10.6 |
| 35 | 1.1 | 55 | 745 | 12.7 | 11.9 |
| 36 | 1.7 | 65 | 920 | 32.5 | 30.8 |

In TABLE 2, No. 21 to No. 27 designate the embodiments of the present invention, and No. 31 to No. 36 designate comparative examples.

As is evident from TABLE 2, in the bearing wherein the area fraction X' of the carbides having an averaged particle diameter of 1 μm or more is 2% or less (more preferably 1% or less) of the area fraction of all the carbides, and wherein the area fraction X" of the carbides having an averaged particle diameter of 0.5 μm or less is 50% or more (more preferably 70% or more) of the area fraction of all the carbides, the carbides precipitated on the surface of the bearing are refined. Therefore, it is found that the bearing tends to exhibit longer life against surface damage, and that the durability of the bearing is improved.

In the comparative examples No. 31 and No. 32, the area fraction X" of the carbides having an averaged particle diameter of 0.5 μm or less is more than 50% of the area fraction of all the carbides. Therefore, the number of areas which are susceptible to surface damage is increased, and the life $RL_{10}$ of a radial shaft of and the life $SL_{10}$ of a thrust shaft of the bearing are sharply decreased. In contrast, in the embodiments No. 21, No. 24, and No. 26, in which the area fraction X" of the carbides having an averaged particle diameter of 0.5 μm or less is 70% or more of the area fraction of all the carbides, the bearings exhibit longer life.

Although the surface hardness HV is also effective against surface damage, an improvement in the hardness of the area fraction X' of the carbides having an averaged particle diameter of 1 μm or more is 2% or less (more preferably 1% or less) of the area fraction of all the carbides, and the area fraction X" of the carbides having an averaged particle diameter of 0.5 μm or less is 50% or more (more preferably 70% or more) of the area fraction of all the carbides, and wherein the surface hardness HV is 750 to 900.

[Second Experiment]

The inventors of the present invention have examined the acoustic characteristics of the ball bearing.

First, the inventors measures mean roughness Ra as a quantitative scale of "waviness" beforehand. Various types of ball bearings, which differ from each other in the mean roughness Ra, are incorporated into a fan motor for use as a household appliance, and there is determined the relationship between the "waviness" developing in the raceway surface of the bearing and in the surface of the rolling element and oscillation which causes noise. An examination is made as to whether the oscillation developing in the ball bearing is caused by the bearing ring or the rolling element.

Figure 11:
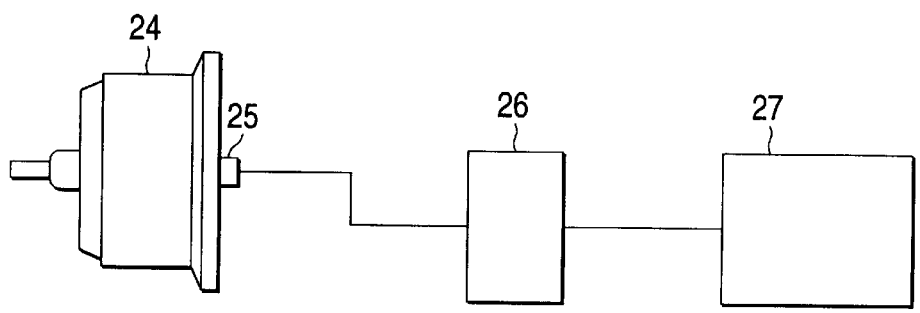
FIG. 11 is a block diagram schematically showing the outline of an oscillation measurement device.

FIG. 11 is a block diagram schematically showing the outline of the an oscillation measurement device used in the foregoing measurement operation. The oscillation measurement device comprises a fan motor 24 having a ball bearing incorporated therein, an acceleration sensor 25 for measuring the oscillation of the ball bearing incorporated in the fan motor 24, a conditioning amplifier 26 for amplifying an oscillation signal measured by the acceleration sensor 25, and an FFT analyzer 27 for analyzing the frequency of the oscillation acceleration signal on the basis of the result of an output received from the conditioning amplifier 26. The peak of oscillation of the rolling element appears at the frequency that is related to the number of balls of the ball bearing and the number of revolutions of the ball bearing, and hence the oscillation of the rolling element can be readily distinguished from the oscillation of the bearing ring by analysis of the frequency of the oscillation acceleration signal through use of the FFT analyzer 27.

Conditions for oscillation measurement are as follows.

[Conditions for Oscillation Measurement]

Type of Test Bearing: Deep Groove Ball Bearing 608
Number of Revolutions of Fan Motor: 984 r.p.m.
Specifications for Measurement Device
Acceleration Sensor; No. 4393 manufactured by B&K Co.
Conditioning Amplifier: No. 2626 manufactured by B&K Co.
FFT analyzer: CF-360Z manufactured by Ono Sokki Co.

Figure 12:
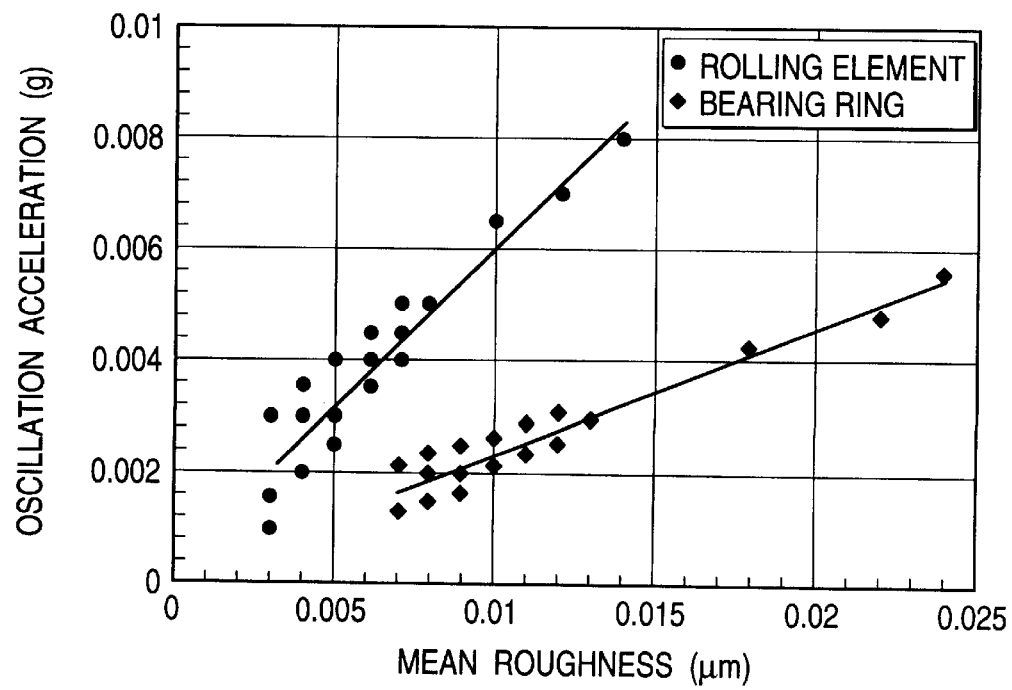
FIG. 12 is a plot of oscillation which shows the relationship between mean roughness Ra and an oscillation acceleration.

FIG. 12 is a plot of oscillation which shows the relationship between mean roughness Ra (i.e., waviness) and an oscillation acceleration. In the drawing, ● designates a measured value of the rolling element, and ◆ designates a measured value of the bearing ring.

As is evident from FIG. 12, by virtue of a working method, the rolling element is superior to the bearing ring with regard to a finished condition, and there is a tendency for the rolling element having a smaller value of mean roughness Ra. However, the rolling element having a small value of mean roughness Ra has a larger oscillation acceleration value. More specifically, the oscillation that develops in the ball bearing and causes sound is found to be primarily caused by the rolling element. Since there are considerable discrepancies in the oscillation acceleration of the rolling element, a bearing having a large value of mean roughness Ra is intentionally manufactured in the working process, and there is measured the relationship between the mean roughness Ra and the oscillation acceleration. It is ascertained that the rolling element tends to show a great oscillation acceleration than the bearing ring. As a result, it has turned out that a reduction in the oscillation of the rolling element is effective in reducing the noise of the ball bearing to a still lower level.

Next, the inventors of the present invention have measured the acoustic characteristics of the rolling element through use of an Anderon meter by variously changing the distribution of carbides precipitated on the rolling element. The Anderon meter detects an Anderon's value which represents the noise of the ball bearing in the form of an oscillating component. In a second experiment, the acoustic characteristics of a ball bearing are evaluated on the basis of the Anderon's value. Forty ball bearings, each of which has the same distribution of carbides, are manufactured, and the Anderon meter is attached to these ball bearings. Under given conditions, the Anderon's value of each of the ball bearings is measured, and a mean value of the thus-measured Anderon's values (this mean value will be hereinafter simply referred to as an "Anderon's value") is evaluated as an acoustic level.

Conditions for the acoustic test are as follows.

[Conditions for Acoustic Test]

Type of Test Bearing: Deep Groove Ball Bearing 608
Number of Revolutions of Fan Motor: 1,800 r.p.m.
Anderon Meter: AD-0200 manufactured by Sugawara Research Center Co.
Extent of Measurement: Hi band (1,800 to 10,000 Hz)
Acceleration Sensor; No. 4393 manufactured by B&K Co.
Conditioning Amplifier: No. 2626 manufactured by B&K Co.
FFT analyzer: CF-360Z manufactured by Ono Sokki Co.

The area fraction of carbides are calculated in the same manner as those are calculated in the first experiment through use of the electronic microscope (JSM-T220A manufactured by Nihon Densi Co.) and the image analyzer (IBAS 2000 manufactured by Carl Zeiss Co.), both being the same as those used in the first experiment.

TABLE 3 shows the relationship between the area fraction X' of the carbides having an averaged particle diameter of 1 μm or more with respect to the area fraction of all carbides, the area fraction X" of the carbides having an averaged particle diameter of 0.5 μm or less with respect to the area fraction of all the carbides, and Anderon's values.

TABLE 3

| No | Area of Fraction X' of Carbides having a mean particle diameter of 1 μm or more (%) | Area of Fraction X" of Carbides having a mean particle diameter of 0.5 μm or less (%) | Anderon's Value (H band) |
|---|---|---|---|
| Embodiments | | | |
| 41 | 0.5 | 72 | 0.400 |
| 42 | 0.8 | 78 | 0.405 |
| 43 | 1 | 85 | 0.405 |
| 44 | 1.3 | 55 | 0.420 |
| 45 | 1.4 | 70 | 0.415 |
| 46 | 1.6 | 65 | 0.415 |
| 47 | 1.9 | 68 | 0.420 |
| Comparative Examples | | | |
| 51 | 1.5 | 34 | 0.530 |
| 52 | 2.5 | 60 | 0.470 |
| 53 | 3.2 | 52 | 0.520 |
| 54 | 1.2 | 45 | 0.520 |

Figure 13:
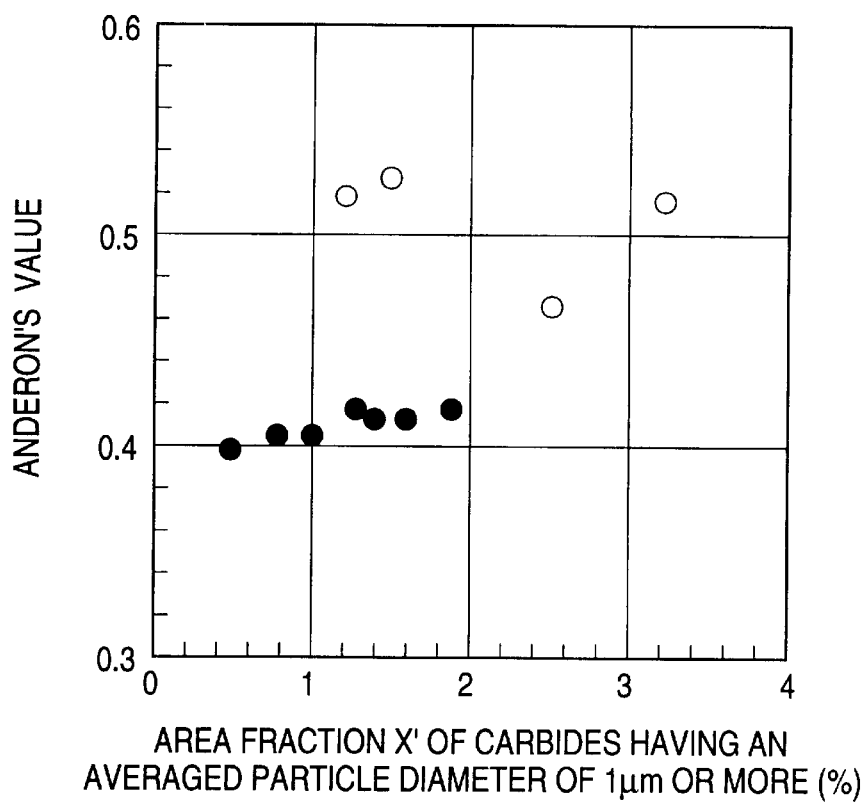
FIG. 13 is a plot showing the relationship between Anderon's values and the area fraction X' of the carbides having an averaged particle diameter of 1 μm or more with respect to the area fraction of all the carbides.

FIG. 13 is a plot showing the relationship between Anderon's values and the area fraction X' of the carbides having an averaged particle diameter of 1 μm or more with respect to the area fraction of all the carbides.

As is evident from TABLE 3 and FIG. 13, in the comparative examples No. 52 and No. 53, the area fraction X" of the carbides having an averaged particle diameter of 0.5 μm or less shares 50% or more of the area fraction of all the carbides. However, in these examples, the area fraction X' of the carbides having an averaged particle diameter of 1 μm or more shares 2% or more of the area fraction of all the carbides, and hence Anderon's values are respectively as large as 0.470 and 0.520. The reason for this is ascribable to the fact that the minute carbides become partially coagulated and bulky to thereby cause great "waviness," which in turn brings about oscillation to thereby sharply deteriorate the acoustic characteristics of the ball bearing.

Figure 14:
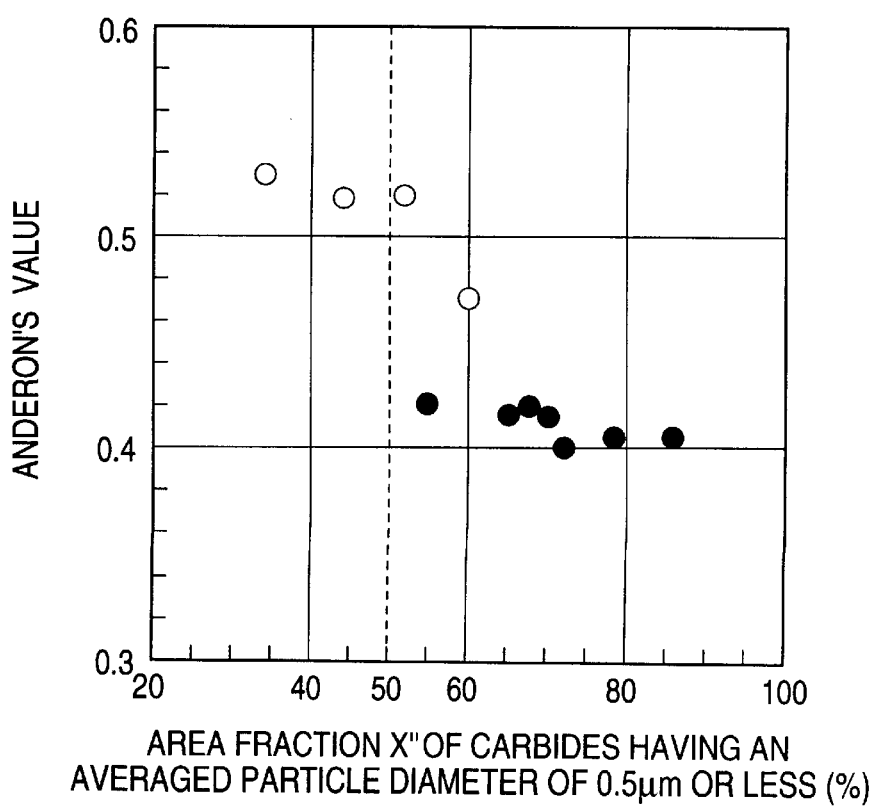
FIG. 14 is a plot showing the relationship between Anderon's values and the area fraction X" of the carbides having an averaged particle diameter of 0.5 μm or less with respect to the area fraction of all the carbides.

FIG. 14 is a plot showing the relationship between Anderon's values and the area fraction X" of the carbides having an averaged particle diameter of 0.5 μm or less with respect to the area fraction of all the carbides.

In the comparative examples No. 51 and No. 54, the area fraction X' of the carbides having an averaged particle diameter of 1 μm or more shares 2% or less of the area fraction of all the carbides. However, in these examples, the area fraction X" of the carbides having an averaged particle diameter of 0.5 μm or less shares 50% or less of the area fraction of all the carbides (designated by a broken line shown in FIG. 14), and hence Anderon's values are respectively as large as 0.530 and 0.520. The reason for this is ascribable to the fact that the carbides precipitated on the surface of the rolling element are insufficiently refined in the state where the area fraction X" of the carbides having an averaged particle diameter of 0.5 μm or less shares 50% or less of the area fraction of all the carbides, and hence it is possible to accomplish a reduction in noise to a much lower value As has been mentioned in detail previously, the present invention provides a rolling bearing comprising 0.9 to 1.1 wt. % C, 0.1 to 0.5 wt. % Si, 0.2 to 0.8 wt. % Mn, 1.0 to 1.8 wt. % Cr, with the balance being Fe and inevitable impurities, wherein at least the surface of the rolling element includes carbides having an area fraction of 5% to 15%; of these carbides, carbides having an averaged particle diameter of 0.5 μm or less share 50% or more of the area fraction of all the carbides; and of the carbides, carbides having an averaged particle diameter of 1 μm or more share 2% or less of the area fraction of all the carbides; and wherein the rolling element has a Vickers surface hardness HV of 750 to 900. Accordingly, granular carbides of high carbon chrome bearing steel which has substantially the same composition as that of the conventional bearing can be uniformly refined, and hence the steel tends to exhibit longer life against surface damage. The durability of a rolling bearing, particularly a needle bearing, can be improved. Further, the acoustic characteristics of a comparatively small ball bearing can be improved at low cost to a much greater extent.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rolling bearing comprising:
   rolling element formed of a steel containing 0.9 to 1.1 wt. % C, 0.1 to 0.5 wt. % Si, 0.2 to 0.8 wt. % Mn, 1.0 to 1.8 wt. % Cr, with the balance being Fe and inevitable impurities,
   wherein at least the surface of the rolling element includes carbides having an area fraction of 5% to 15%;
   of these carbides, carbides having an averaged particle diameter of 0.5 μm or less share 50% or more of the area fraction of all the carbides;
   of the carbides, carbides having an averaged particle diameter of 1 μm or more share 2% or less of the area fraction of all the carbides; and
   wherein the rolling element has a Vickers surface hardness HV of 750 to 900.

2. The rolling bearing according to claim 1, in which said content of C is set to a range of 0.95–1.05 wt %.

3. The rolling bearing according to claim 1, in which said content of Si is set to a range of 0.15–0.35 wt %.

4. The rolling bearing according to claim 1, in which said content of Mn is set to a range of 0.25–0.5 wt %.

5. The rolling bearing according to claim 1, in which said content of Cr is set to a range of 1.30–1.60 wt %.

6. The rolling bearing according to claim 1, in which said carbides have said area fraction in a range of 9% to 12%.

7. The rolling bearing according to claim 1, in which the area fraction of said carbides having an averaged particle diameter of 0.5 μm or less is set to 70% or more of the area fraction of all the carbides.

8. The rolling bearing according to claim 1, in which the area fraction of the carbides having an averaged particle diameter of 1 μm or more is reduced to 1% or less of the area fraction of all the carbides.

9. The rolling bearing according to claim 1, in which the rolling element has a Vickers surface hardness HV in a range of 770 to 850.

10. The rolling bearing according to claim 1, in which said steel further contains, O (oxygen) and Ti (titanium), in which the percentage content of O is set to be 15 ppm or less and the percentage content of Ti is set to be 60 ppm or less.

11. The rolling bearing according to claim 1, in which the amount of residual austenite contained in said rolling element is set to 6% or less.

12. The rolling bearing according to claim 1, in which the surface roughness of the rolling element is set to 3 μm or less RMS.

* * * * *